(12) United States Patent
Manesh et al.

(10) Patent No.: US 9,382,283 B2
(45) Date of Patent: *Jul. 5, 2016

(54) OXYGEN ASSISTED ORGANOSOLV PROCESS, SYSTEM AND METHOD FOR DELIGNIFICATION OF LIGNOCELLULOSIC MATERIALS AND LIGNIN RECOVERY

(71) Applicant: American Science and Technology Corporation, Chicago, IL (US)

(72) Inventors: Ali Manesh, Chicago, IL (US); John H. Guenther, Merrill, WI (US); Edwin G. Zoborowski, Wausau, WI (US); Walter Braenner, Wausau, WI (US); Mohammad Ali Manesh, Chicago, IL (US); Lee J. Hawk, Wausau, WI (US)

(73) Assignee: American Science and Technology Corporation, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/449,812

(22) Filed: Aug. 1, 2014

(65) Prior Publication Data

US 2016/0031921 A1 Feb. 4, 2016

(51) Int. Cl.
*C07G 1/00* (2011.01)
*C08L 97/00* (2006.01)
(Continued)

(52) U.S. Cl.
CPC .. *C07G 1/00* (2013.01); *C08H 6/00* (2013.01); *C08H 8/00* (2013.01); *C08L 97/005* (2013.01); *D21C 1/00* (2013.01); *D21C 3/00* (2013.01)

(58) Field of Classification Search
CPC .............. C08H 6/00; C08H 8/00; D21C 1/00; D21C 3/00; Y02P 30/20; C07G 1/00
See application file for complete search history.

(56) References Cited

U.S. PATENT DOCUMENTS 3,776,897 A * 12/1973 Ikari et al. ................ C08H 6/00
210/729
4,397,712 A 8/1983 Gordy
(Continued)

OTHER PUBLICATIONS

Zhao, Cheng and Liu, Organosolv Pretreatment of Lignocellulosic Biomass for Enzymatic Hydrolysis, Applied Microbiology and Biotechnology, 82:815-827, Springer-Verlag (2009).
(Continued)

*Primary Examiner* — Michael A Salvitti
(74) *Attorney, Agent, or Firm* — Beem Patent Law Firm (57) ABSTRACT

An oxygen assisted Organosolv process for a more efficient delignification and producing bio-products by decomposing lignocellulosic materials comprises providing a lignin solvent with water, an acid, an oxidant and one or more lignin dissolving chemicals. The process also includes placing biomass in contact with oxidant, acid, water, the lignin solvent in any order or combined to form a recyclable solvent, and recycling at least a portion of the recyclable solvent by circulating the recyclable solvent back into contact with the biomass. The circulating of the recyclable solvent occurs for a period of time, during which, acid and oxidant may be added if necessary as they may be consumed by the process, after which, the process then includes separating material such as chemicals and lignin from the recyclable solvent. The chemicals can be recycled as new lignin dissolving solvent or sold, while lignin can be used as natural and renewable colorant for polymers such as poly lactic acid, or mixed with other polymers as an additive and extruded or injected to consumable polymeric parts, or can be used and the natural source of renewable aromatics. Application of an oxidant will help the overall fractionation process by changing the chemical characteristics of the lignin and therefore allows more lignin to be removed from biomass. At the end, the lignin is separated from the lignin dissolving solvent by a separation process to also reclaim the lignin dissolving solvent for the next fractionation process.

34 Claims, 8 Drawing Sheets

Process Flow Diagram, Organosolv Based Cellulosic Bio-Fuel (51) Int. Cl.
*D21C 3/00* (2006.01)
*C08H 8/00* (2010.01)
*D21C 1/00* (2006.01)
*C08H 7/00* (2011.01)

(56) References Cited

U.S. PATENT DOCUMENTS

| | | | |
|---|---|---|---|
| 4,470,851 A | 9/1984 | Paszner et al. | |
| 4,511,433 A * | 4/1985 | Tournier | D21C 3/003 127/37 |
| 4,536,584 A | 8/1985 | Eskamani et al. | |
| 4,746,401 A | 5/1988 | Roberts et al. | |
| 4,764,627 A | 8/1988 | Diebold et al. | |
| 4,793,898 A | 12/1988 | Laamanen | |
| 5,026,808 A | 6/1991 | Schroeder | |
| 5,049,236 A * | 9/1991 | Dimmel | C07C 46/00 162/16 |
| 5,091,054 A | 2/1992 | Meier et al. | |
| 5,246,543 A * | 9/1993 | Meier | D21C 9/1036 162/65 |
| 5,424,417 A | 6/1995 | Torget et al. | |
| 5,503,996 A | 4/1996 | Torget et al. | |
| 5,705,369 A | 1/1998 | Torget et al. | |
| 5,788,812 A * | 8/1998 | Agar | C07D 307/50 162/16 |
| 6,007,678 A | 12/1999 | Linsten et al. | |
| 6,019,870 A | 2/2000 | Devic et al. | |
| 6,022,419 A | 2/2000 | Torget et al. | |
| 6,165,318 A | 12/2000 | Paren et al. | |
| 6,214,164 B1 | 4/2001 | Rantala | |
| 6,398,908 B1 * | 6/2002 | Hermansson | D21C 9/1005 162/65 |
| 6,503,369 B2 * | 1/2003 | Rousu | C05D 1/00 162/29 |
| 6,692,578 B2 | 2/2004 | Schmidt et al. | |
| 6,824,645 B2 | 11/2004 | Jaschinski | |
| 6,923,887 B2 | 8/2005 | Pan | |
| 7,465,791 B1 | 12/2008 | Hallberg et al. | |
| 7,931,784 B2 | 4/2011 | Medoff | |
| 7,932,065 B2 | 4/2011 | Medoff | |
| 8,017,818 B2 | 9/2011 | Cortright et al. | |
| 8,053,566 B2 | 11/2011 | Belanger et al. | |
| 8,053,615 B2 | 11/2011 | Cortright et al. | |
| 8,083,906 B2 | 12/2011 | Medoff | |
| 8,137,628 B2 | 3/2012 | Cheiky et al. | |
| 8,142,620 B2 | 3/2012 | Medoff | |
| 8,143,464 B2 | 3/2012 | Cheiky et al. | |
| 8,168,038 B2 | 5/2012 | Medoff | |
| 8,168,840 B2 | 5/2012 | Brady et al. | |
| 8,173,406 B1 | 5/2012 | Wang et al. | |
| 8,193,324 B2 | 6/2012 | Hallberg et al. | |
| 2004/0231060 A1 * | 11/2004 | Burdette | C12N 9/0006 8/115.51 |
| 2008/0196847 A1 * | 8/2008 | Pieter van Heiningen | D21C 1/06 162/9 |
| 2009/0090478 A1 * | 4/2009 | Hollomon | D21C 9/147 162/65 |
| 2009/0118477 A1 * | 5/2009 | Hallberg | B01D 3/002 530/500 |
| 2009/0145021 A1 | 6/2009 | Guay et al. | |
| 2010/0043782 A1 | 2/2010 | Kilambi et al. | |
| 2010/0249390 A1 * | 9/2010 | Azuma | C07G 1/00 530/507 |
| 2010/0279361 A1 * | 11/2010 | South | A23K 1/146 435/101 |
| 2011/0192072 A1 | 8/2011 | Steele et al. | |
| 2012/0116063 A1 | 5/2012 | Jansen et al. | |
| 2013/0023702 A1 * | 1/2013 | Qiao | C10G 3/45 568/959 |
| 2013/0036660 A1 * | 2/2013 | Woods | C10G 3/42 44/307 |
| 2013/0118059 A1 | 5/2013 | Lange et al. | |
| 2014/0227161 A1 * | 8/2014 | Manesh | C07C 45/00 423/437.1 |
| 2014/0242867 A1 * | 8/2014 | Jansen | C07G 1/00 442/181 |
| 2014/0259888 A1 * | 9/2014 | Wang | A23D 9/02 44/411 |
| 2014/0275501 A1 | 9/2014 | Capanema et al. | |
| 2014/0326422 A1 * | 11/2014 | Fallon | D21C 3/20 162/16 |
| 2015/0107790 A1 * | 4/2015 | Sixta | C08B 1/003 162/76 |
| 2015/0176031 A1 | 6/2015 | Streffer | |
| 2016/0031921 A1 * | 2/2016 | Manesh | C07G 1/00 524/72 |

OTHER PUBLICATIONS

Drljo, Weinwurm and Friedl, Evaluation and Optimization of Organosolv Process, Thermal Process Engineering, Vienna Institute of Technology, Institute of Chemical Engineering (2012).

Cybulska, Lei, Julson and Brudecki, Optimization of Modified Clean Fractionation of Prairie Cordgrass, Int'l, J. of Agric. And Biol. Eng. 5.2, 1-10 (Jun. 2012).

Hergert and Pye, Recent history of organosolv pulping, Solvent Pulping Symposium, 9-26 (1992).

Vallejos, Felissia, Curvelo, Zambon, Ramos and Area, Chemical and Physico-Chemical Characterizations of Lignins obtained from ethanol-water fractionation of bagasse, Bio Resources 6(2), 1158-1171 (2011).

Huijgen, De Wild and Reith, Lignin Production by Organosolv fractionation of lignocellulosic biomass, Energy Research Center of the Netherlands, International Biomass Valorization Congress, 13-15 (Sep. 2010).

Huijgen, Laan and Reith, Modified organosolv as a fractionation process of lignocellulosic biomass for co-production of fuels and chemicals, 16th European Biomass Conference and Exhibition, 2-6, Valencia Spain (Jun. 2008).

* cited by examiner

Process Flow Diagram, Organosolv Based Cellulosic Bio-Fuel

OXYGEN ASSISTED ORGANOSOLV PROCESS, SYSTEM AND METHOD FOR DELIGNIFICATION OF LIGNOCELLULOSIC MATERIALS AND LIGNIN RECOVERY

BACKGROUND OF THE INVENTION

1. Field of the Invention

The subject matter herein is generally directed to delignification and fractionation of a lignocellulosic biomass using organosolv processes assisted by an oxidant such as hydrogen peroxide or oxygen gas, particularly to such organosolv processes that uses any lignin dissolving chemicals such as organic solvents to remove lignin from lignocellulosic biomass, generates additional lignin dissolving solvents during fractionation process that can be used as lignin dissolving solvent and placed in contact with more lignocellulosic biomass for additional delignification cycles, and separate lignin from the lignin dissolving solvent before or after the solvent is completely saturated with lignin.

2. Description of the Related Art

Several attempts have been made to apply an organosolv fractionation process that recycles certain chemicals from lignin solvent used to delignify lignocellulosic materials and produce cellulose or fiber for pulp and paper applications or hydrolysis of cellulose to make C6 sugar that can be converted to renewable chemicals, biofuels and other sugar based products. One of the major drawbacks for this type of fractionation process is that solvent recovery may be limited, which directly affects the economic feasibility of the process. Therefore, there exists a need for a system that can maintain or regenerate solvent during a delignification process to increase the economic viability.

Another economic drawback is that the cost of the fractionation of biomass typically is higher than the financial benefits realized from producing cellulose fiber alone. In other words, to have a profitable process, the process should be optimize such that nearly all of the biomass is used up, ideally with a near zero waste, and produce high value and marketable products. In addition, to maximize the process economics' viability, the delignification process should be done in a shortest time and a lowest temperature to use the least amount of energy for production of more organic solvents and good quality fibers.

Yet another drawback of the prior arts, is the cost of separation of any particular lignin dissolving solvent from the mixture of various chemicals that are produced during lignocellulosic fractionation process that can be used for the next cycle. Thus, a desire exists to provide an organosolv process that lignin dissolving solvent is not a single chemical that requires an expensive operation for recovery and recycling, can readily reproduce itself during fractionation process, can remove more lignin from lignocellulosic biomass, and results in a good quality pulp for pulp using industries as well as different and more classes of organic bio-chemicals during a fractionation process.

In addition, although organosolv process produces pure lignin that is highly desirable, but traditionally these processes have used higher temperature for fractionation of lignocellulosic biomass and as a result could reduce pulp that are not too good in fiber's strength. In addition, pulps produced by organosolv processes have typically a higher KAPPA number that means more remaining lignin in the pulp. A combination of lesser fiber strength and higher remaining lignin has made organosolv pulping less desirable such that it has not been able to compete with other mature pulping processes such as Kraft process. Therefore, a desire exists to provide an organosolv process that can remove more lignin to produce pulps with smaller KAPPA numbers that can compete with other pulping processes.

SUMMARY OF THE INVENTION

The deficiencies mentioned above are resolved by the organosolv fractionation process that also uses an oxidant such as oxygen gas or hydrogen peroxide that allows more lignin removal and improves quality of the final produced pulp disclosed herein. Generally, the process is directed to the use of biomass materials in a reactor with an initial lignin solvent that has two partially miscible liquids one being a fresh or recycled lignin dissolving compound (herein referred to as the lignin dissolving chemical even though it may include or be formed from multiple chemicals), the other being water or recycled water, plus an acid or combinations of acids, and an oxidant such as oxygen gas atmosphere or hydrogen peroxide all together are called initial solvent, and cooking them under autoclave conditions for a certain period of time. After the initial solvent including the initial lignin dissolving chemical is placed in contact with the biomass by running it on, over, or through the biomass, the reaction with the biomass results in a new form of the solvent that consists of water, lignin dissolving chemicals, lignin, organic material produced as a result of lignocellulosic biomass decomposition that include lignin dissolving chemicals, and other chemicals that all together are called recyclable solvent. All or part of the recyclable solvent can then be re-circulated back into contact with more biomass or a biomass still remaining in the reactor and for further transformation of the solvent into usable compounds and chemicals that can be used to produce final products such as renewable chemicals, pure lignin, and cellulose. After a period of time, part or all of the recyclable solvent is removed and settled or separated into further organic material and aqueous parts that can be recycled or reused in the next initial solvent for a new biomass. During the process, oxidant and acid are partially consumed for oxidation of various chemical that in part will result to break cellulose walls and help in delignification process, and therefore may be added to the recyclable solvent as necessary when and if the recyclable solvent is placed with more biomass for more delignification process.

By one approach, in an oxygen assisted organosolv process for producing bio-products by decomposing lignocellulosic materials, the biomass is place in contact with an oxidant such as hydrogen peroxide for a period of time to first impregnated the biomass with the oxidant, followed by adding acid to acidify the impregnated biomass, followed by adding water to flow acid and hydrogen peroxide more freely through biomass particles, followed by adding lignin dissolving chemicals, to make the recyclable solvent, and process the mixture inside a reactor for a period of time at a temperature above 150 C to proceed with delignification process. And by other approach, the biomass is placed in contact with acid first to acidify it followed by adding oxidant, water and lignin dissolving chemicals to make the recyclable solvent. Both acid and oxidant may be used to oxidize various chemicals and in part to break the cellulose walls and therefore expose more lignin to the lignin dissolving chemical. And yet by another approach, the biomass is soaked in water or lignin dissolving chemical or both for a period of time before the mixture is acidified and oxidant is added.

Alternatively by one approach, an oxygen assisted organosolv process includes premixing oxidant, acid, water, and lignin dissolving chemicals to form the recyclable solvent first and them placing the recyclable solvent in contact with a biomass to form a mixture and then use any types of agitation such as forced or natural agitation or permeate the solvent through the bed of biomass by circulation of the recyclable solvent to assure adequate contacts between biomass and the recyclable solvent for a period of time. At any given time, the recyclable solvent can be settled and divided into an aqueous portion and an organic material portion due to their specific densities by any means that can separate materials based on their densities such as leaving the recyclable solvent in a settling tanks or by passing it through a centrifuges. At least a portion of the aqueous portion, the organic material portion, or both can be reused in an initial solvent to be placed in contact with a new biomass.

Specifically, by one approach, the oxygen assisted organosolv process comprises providing an initial solvent comprising fresh or recycled water, an acid, an oxidant such as hydrogen peroxide, and a lignin dissolving chemical or several lignin dissolving chemicals comprising at least one of an organic ester, butyl acetate, an organic furan, fufural, other lignin dissolving chemicals, some combination of these lignin dissolving chemicals or all of them combined. In this process, the initial solvent including an oxidant is then placed in contact with a biomass and maximizing their contact by applying some types of mixing process such as forced agitation like using a mechanical mixer or an ultrasound source, or a type of natural agitation as a result of heating the mixture from sides, or circulating the solvent by running the solvent on, over, or through the biomass. The process then involves recycling all or at least a portion of the recyclable solvent by circulating the recyclable solvent back into contact with the biomass, or continue placing biomass in contact with the recyclable solvent for natural penetration of solvent into biomass, or use any type of agitation to continue mixing or providing more possibilities for the recyclable solvent to be in contact with biomass for a period of time. After the period of time, the process includes separating material from the recyclable solvent to claim the products.

In this process, the initial lignin dissolving chemical may include ethanol, butanol, any organic materials produced as a result of decomposition of lignocellulosic materials such as organic esters, organic furans, etc., any other lignin dissolving chemicals, a combination of some of these chemicals, or all of these chemicals together. After the initial lignin dissolving solvent is used once, the new lignin dissolving solvent may include all the initial lignin dissolving solvents and any organic materials produced as a result of decomposition of lignocellulosic biomass, with or without any separation of any chemicals or lignin from it.

By another approach, the recyclable solvent with or without oxidant is place in contact with biomass inside a reactor under an atmosphere that includes oxygen or an oxidizing gas or gases, at a pressure above atmospheric pressure, and agitate the mixture to expose more biomass and solvent to the lignin dissolving chemical, acid, and the oxidant. In this process, the recyclable solvent including with or without an oxidant is then placed in contact with a biomass and maximizing their contact by mixing the recyclable solvent and biomass together. The process then involves recycling all or at least a portion of the recyclable solvent by circulating it back into contact with the biomass, or continue placing biomass in contact with the recyclable solvent for natural penetration of solvent into biomass, or use any type of agitation to continue mixing to assure that the recyclable solvent is in contact with biomass and together are in contact with more oxygen or oxidizing gas for a period of time. After the period of time, the process includes separating material from the recyclable solvent.

By another approach, an oxygen assisted organosolv process for producing bio-products by decomposing lignocellulosic materials comprises providing a first initial lignin solvent comprising water, an organic acid such as acetic acid, formic acid, etc. or an inorganic acid such as sulfuric acid, or any combinations of organic and inorganic acids, an oxidant such as oxygen gas or hydrogen peroxide, and a lignin dissolving chemical. Next, the process includes placing the first initial lignin solvent in contact with a first biomass, and then recycling at least a portion of the solvent by circulating it back into contact with the biomass for a period of time to form the recyclable solvent. Alternatively, the process includes placing the first initial solvent including an oxidant in contact with a first biomass to form a mixture and then use any means such as forced or natural agitation or permeation through to assure adequate contacts between biomass and the solvent for a period of time. At any given time, the recyclable solvent can be divided into an aqueous portion and an organic material portion due to their densities by using any means that can separate materials with their densities such leaving them in a settling tanks and allow aqueous layer goes on bottom and organic layer stay on top, or by passing them through a centrifuge. At least a portion of the aqueous layer, the organic material portion, or both can be reused in an initial lignin solvent or as the recyclable solvent to be placed in contact with a new biomass. In one form, the lignin dissolving chemical of the first initial lignin solvent is butanol. By another form, the reused organic material portion for use with a new biomass includes any organic chemicals produced as a result of decomposition of lignocellulosic materials such as butyl ester, organic furfural, or a combination of both. By another approach, biomass with or without any portion of the recyclable solvent is placed inside the reactor at a certain temperature and all or the remaining recyclable solvent is passed through a heat exchanger to elevate its temperature before it is injected into the reactor and placed in contact with biomass to form a mixture, and an external or an internal heater can be used to continue heating up the reactor or to maintain the required process temperature for the requires process duration with or without any agitation, with or without any circulation of the recyclable solvent.

Among the various constituents of lignocellulosic biomass is lignin that is found in a wide variety of molecular weights and may be composed of various proportions of coniferyl, p-coumaryl and sinapyl alcohols. While articles and methods pertaining to lignin from biomass are known in the art, no process has hitherto been disclosed separation of lignin from lignocellulosic biomass using oxygen assisted organosolv process whereby a composition comprising lignin is prepared from lignocellulosic biomass that is suitable for use as a dye or as a plasticizer or as a filler or additive compatible with any of various polymers used to make plastic articles. Application of an oxidant during organosolv fractions causes change the lignin characteristics such as reduction of its melting point, that depend on the extent of this change, the resultant lignin may become suitable for use as an adhesive, a colorant for polymers, or a low cost additive and filler that blends well with various polymers.

DETAILED DESCRIPTION OF THE PREFERRED EMBODIMENTS

Disclosed herein is a temperature, atmosphere, and time controlled, oxygen assisted organosolv fractionation process that uses a solvent, consisting water, a lignin dissolving solvent, acid, and oxidant together called initial solvent, to interact the acid the oxidant, and the lignin dissolving chemicals, with any lignocellulosic biomass material to separate the lignin from cellulose, converts the hemicellulose to organic chemicals, and changes the composition of the initial solvent into a new solvent that includes some or all materials in the initial solvent plus all the chemicals resulted from decomposition of lignocellulosic biomass, and the end result is a solid phase that includes most of the remaining cellulose, and a liquid phase that includes all or part of the initial solvent, and all or part of the chemicals produced as a result of biomass decomposition that together is called recyclable solvent. After separation of the recyclable solvent or liquid phase from the remaining cellulose or solid phase, part of all of the recyclable solvent can be used to place in contact with more lignocellulosic biomass for more delignification or can be send to further separation processes to separate lignin and other chemicals from each others.

To increase the efficiency of the process, since some of the materials within the initial or recyclable solvent may be consumed when placing in contact with the biomass, if all or part of the recyclable solvent is recycled and place in contact with more biomass or the biomass still inside the reactor, more oxidant, or acid, or lignin dissolving solvent may be added to the recyclable solvent.

The recyclable solvent may be reused with no, partial, or complete separation processes to separate some or all lignin and other chemicals out. Thus, the resulting chemicals individually or combined, with or without any remaining recyclable solvent, with or without any lignin forms the recyclable solvent and may be recycled back for more delignification processes.

It was discovered that the use of oxygen, that is typically a bleaching agent, can further break down the structure of cellulose, decompose part of cellulose to glucose or organic chemicals such as formic acid and formic acid butyl ester or other materials produced as a result of cellulose decomposition. Oxygen is a consumable item in this process and most of the organic chemicals such as formic acid and esters that are produced as a result of cellulose deterioration are good lignin solvents as well and help further delignification of lignocellulosic biomass. Therefore the process is able to generate more organic solvents that can either be used as the recyclable solvent or can be partially or completely separated by distillations, filtration, membranes separation, etc. for sales and other applications.

It was also discovered that as a result of oxygen application and its consumption, yield of fiber slightly decreases since oxygen helps to breakdown the fibers, decompose the cellulose to other cellulose derivatives such as glucose and formic acid, and as a result, allows more lignin to become exposed to organic solvents and therefore even further assists in lignin removal that decreases the KAPPA number for the final pulp produced as a result.

Moreover, the process is much more efficient since it uses the produced lignin dissolving chemicals obtained from the resulting fractionation process as new recyclable solvent that can be place in contact with more biomass in presence of oxygen for delignification of more biomass. For instance, once the process is complete for a biomass currently in the reactor, the recyclable solvent may be separated into parts including an organic material portion that also includes the lignin, and an aqueous solution portion. The organic material portion and aqueous solution portion may then be reused for the initial lignin solvent to be circulated over the next new biomass (or batch if a batch process is used). The organic material portion and aqueous solution portion may be placed in the new initial lignin solvent without further separating or processing. Alternatively, for example, the organic material portion may be further distilled as explained below to obtain certain chemicals such as the produced butyl ester or organic furan or both. Then, when desired, just these certain chemicals with some additional oxidants and acid may be used as the lignin dissolving chemicals in a new initial lignin solvent for the next new biomass. The reused chemicals may form the entire next initial lignin solvent or may reduce the amount of fresh solvent chemicals such as butanol necessary for continuing the process over multiple or many subsequent new biomasses.

The acetic acid remaining in an aqueous part of the recyclable solvent also may be reused for the next initial lignin solvent. Thus, the acid selected for the initial solvent can also improve the process, in one form, using acetic acid instead, or in addition to, sulfuric acid in the initial lignin solvent will produce more butyl acetate although less furfural.

The formic acid produced as a result of cellulose decomposition is also helps to further hydrolyze the hemicellulose and thus improve the process. In one form, using formic acid instead, or in addition to other organics or inorganic acids in the initial lignin solvent will produce more formic acid butyl ester.

Prior to fractionation process, biomass can be physically processed, subdivided into parts or pieces (e.g., biomass can be chopped, milled or ground into pieces or parts that can be characterized as granules, particulates or fine powders). Biomass can be subjected to external forces or pressure (e.g., by being pressed). When carrying out such processing conditions, biomass can have a moisture content that approximates its natural moisture content (e.g., its moisture content immediately upon harvest), a moisture content achieved by adding moisture to the biomass or a moisture content that results from the drying of the biomass.

By also varying the conditions or parameters of the process, the process may become more efficient. For example, the process increases production of butyl ester when the process uses higher temperatures than 180° C. As the operating temperature increases, the process allows more deterioration of cellulose and increases production of resulting chemicals such as formic acid, pentanoic acid, and other organic chemicals. At such a relatively higher temperature, more lignin is extracted from the raw biomass materials, and in turn, more dissociated cellulose fibers exist on the biomass, for example, and therefore, the remaining pulp with less lignin and a lower KAPPA number that would be more advantages for paper manufacturing, or it better facilitates sugar production.

In another form the process uses an increased reaction time interval where the mixture of ingredients are held in a reactor to increase removal of hemicellulose and lignin and produce more organic materials that can be used as lignin dissolving organic solvent.

In a further form, the process uses about five to fifteen grams of solvent per every one gram of lignocellulosic material. In another form, the process uses a ratio of about five to one grams solvent to biomass.

In general, the more hydrogen peroxide is used, the more cellulose bonds are broken and more lignin are removed at a lower process time. If less hydrogen peroxide is used, more process time is allowed for delignification of lignocellulosic biomass. In one form, the process uses about 0.6 gram of hydrogen peroxide per every one gram of biomass to delignify lignocellulosic materials in 90 minutes to produce pulps with a KAPPA number of 40. In yet another form, very small amount of hydrogen peroxide is used to just facilitate the fractionation processes.

It is widely accepted that the structure of lignin stems from the polymerization and oxidation of three types of phenylpropane units. These units are coniferyl (guaiacyl, G), sinapyl (syringyl, S) and p-coumaryl (H). Under oxidative lignin decomposition these G, S and H units yield predominately derivatives of vanillin, syringaldehyde and substituted phenols, respectively that also facilitate more lignin to be removed from lignocellulosic biomass.

It was discovered that depend on the lignin dissolving solvent's ingredients, it can dissolve 5 to 25% lignin before saturation. The dissolved lignin can be precipitated in form of lignin salt by introduction of some minerals, or can be separated in form of pure lignin by some means of separation process such as distillation, membrane, ion exchange resins, increase or decreasing the solutions temperature, etc.

In an embodiment, the separating lignin from lignin dissolving solvent process comprises freezing the solution that results in partial precipitation of lignin.

In another embodiment, the separating lignin from lignin dissolving solvent process comprises heating up the solution that results in vaporization of lignin dissolving solvent and separation of lignin. The vapor results from this process is condensed to reclaim the lignin dissolving solvent that can be placed with more lignocellulosic biomass for more delignification.

In another embodiment, the separating lignin from lignin dissolving solvent process comprises application of membrane that can only allow lignin dissolving solvent to pass through and keep the lignin for collection.

In yet another embodiment, the separating lignin from lignin dissolving solvent process comprises application of one or several ion exchange resins that can separate esters, ethers, furans, organic acids, etc. from lignin.

In another embodiment, the separating lignin from lignin dissolving solvent process comprises adding more water to the solution and evaporate the mixture of water, lignin dissolving solvent together. This process ends up in production of lignin with less remaining lignin dissolving solvent in it. Due to differences between densities of water and the lignin dissolving solvent, in such a mixture, water stays below and some of the lignin dissolving solvents stay on top, and during evaporation, top layer is evaporated faster and since lignin is not dissolved in water at the end when water is all evaporated, the remaining lignin will have a limited to zero remaining lignin dissolving solvent in it.

In still another embodiment, the separating lignin from the lignin dissolving solvent process comprises; chromatography, distillation, filtration, pressing, recrystallization, and/or solvent-solvent partitioning.

It has been known in the art that by application of traditional pulp manufacturing process, lignin is rarely isolated in pure form and is generally not free from other contaminating materials. The lignin obtained from oxygen assisted organosolv process is pure lignin, insoluble in water, with some to no lignin dissolving solvent in it, and depend on the extent of oxidation and source of the lignocellulosic biomass, with a melting point between 50° C. to over 250° C.

It has been discovered that availability of some lignin dissolving solvent in lignin helps to reduce the melting point of the lignin, and therefore helps lignin to blend much better with polymer and form bounds between lignin and polymer during co-injection or co-extrusion process.

A representative sample prepared according to a process such as described herein was determined to have an ash content of 2.38% that was determined by tests for representative samples. For this test clean, dry porcelain crucibles with lids were ignited in a muffle furnace at 525° C. for ~30-40 minutes. After taking the crucibles out of the oven, they were placed in a desiccator, cooled to room temperature and weighed. The oven-dried samples (OD) were then placed in the crucibles and ignited at temperature.

Biomass Fractionation Process

Now in more detail, lignocellulosic feedstock that forms the biomass used by the process may include a wide variety of material such as agricultural wastes, forestry, products, forestry wastes, cellulosic rich municipal wastes, or other cellulose rich industrial wastes, and more specifically, materials ranging from wood, wood chips, bagasse, grass, corn stover, corn stalks, bark, straw, energy crops, and specially any leftover wastes from any agricultural crops to name a few examples. The main problem with lignocellulosic materials as a feedstock is releasing the cellulose itself. In a plant, fibers are glued together by lignin and the combination gives plant its strength. To release the cellulose from the lignin, by one approach, the lignin may be dissolved in a lignin dissolving chemical in presence of acid and an oxidant such as O2 or hydrogen peroxide. While a solvent including the lignin dissolving chemical dissolves lignin and causes delignification of biomass, to promote the process, acid is used to partially hydrolyze cellulose to sugar and exposes more lignin to organic solvent. Furthermore, to increase lignin removal, oxygen source such as hydrogen peroxide is used to even further decomposes some more cellulose and therefore exposes more lignin to organic solvent and allows more delignification of biomass that can produce pulp with a lower KAPPA number suitable for paper industries. Pulp with less lignin also takes less time to be hydrolyzed to sugar if enzymatic treatment is applied.

In one form, the oxygen assisted organosolv based fractionation process used to dissolve the lignin here includes mixing biomass and solvent in a pressurized reactor at a certain temperature for a certain time and under a certain atmosphere that include oxygen in form of O2 gas. This results in production of organic materials, lignin, fiber, and some sugar.

Figure 1:
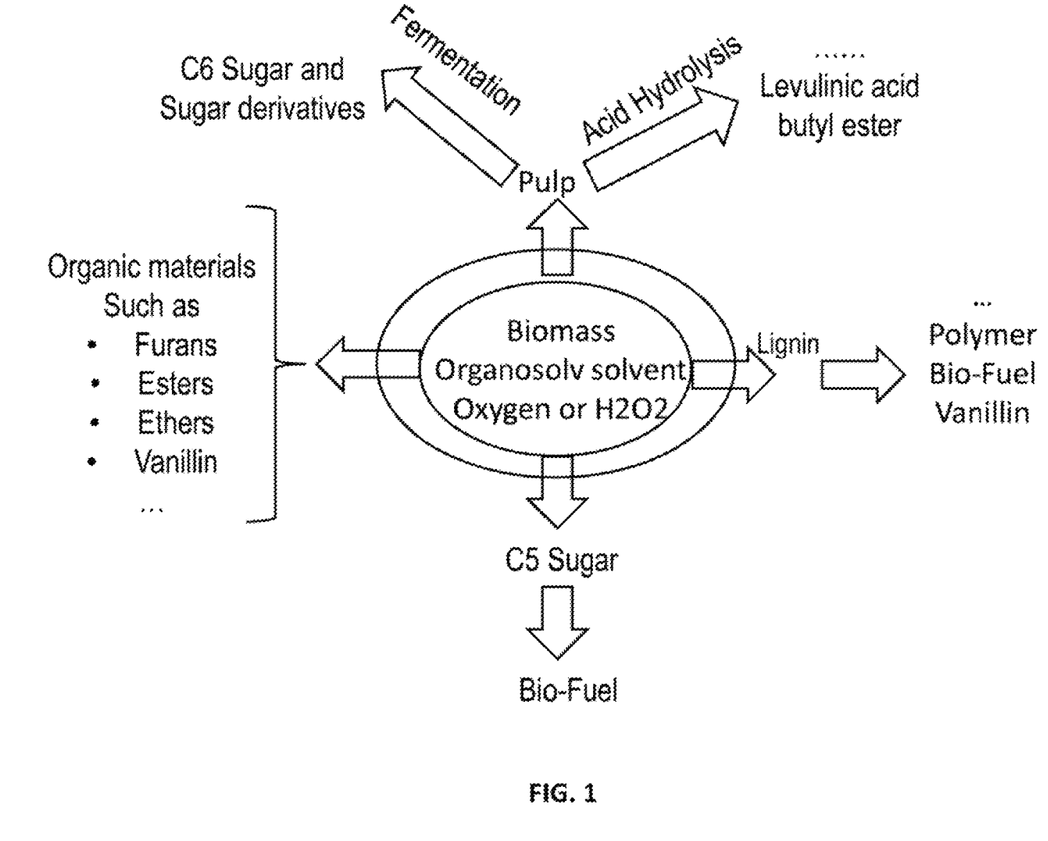
FIG. 1 is a diagram of an oxygen assisted biomass fractionation process and the products produced therefrom.

Referring to FIG. 1, one advantage of this oxygen assisted organosolv process is that all the fractions products may be collected separately and utilized separately to make this process more selective and profitable. In other words, when lignin dissolving chemical is being used with water, acid, and oxygen as the recyclable solvent, is placed in contact with a given lignocellulosic biomass the process ultimately produces fibers that are not soluble in recyclable solvent in a form of solid, and all other materials that are soluble in the recyclable solvent in a form of liquid. If the liquid placed in a settling or separating tank, the solvent separates into two layers including an upper organic layer (the liquor) that includes all materials that are soluble in that layer, and a lower aqueous layer that includes all water soluble materials coming from the recyclable solvent or as a result of linocellulosic biomass fractionation. Alternatively a centrifuge can be used to separate the aqueous layer from the organic layer.

The organic layer substantially includes all materials left over from the original or initial input solvent, or all materials left over from the recyclable solvent, plus lignin, and most of the organic materials made during the fractionation process. The aqueous layer includes water and all water soluble materials such as sugars, some minerals, acids, and organic materials based on their solubility in water. Thus, the process is adaptable because the materials produced from the fractionation can be separated and removed easily to produce a desired resulting chemical or product.

Also, the oxygen assisted fractionation process here can be controlled by its process parameters to produce combinations of products. For example, the biomass, acid, and lignin dissolving chemical in the solvent, when mixed with oxygen and heated under pressure, may separate lignin from lignocellulosic materials and dissolve it within the recyclable solvent. When the lignin is separated from the solvent, the lignin can be used as the main source of renewable aromatic materials for production of bio-fuels, and other products or can be used as a natural polymer in form of additives to be co-injected into molds to make consumable polymer products in plastic industries, or co-extruded into plastic sheets for other applications. Or when the hemicellulose if hydrolyzed, C5 sugar is produced and dissolved in the aqueous layer that may also be obtained for use in biofuels' manufacturing. In addition, the resulting pulp may be used for pulp derivative products such as paper, linerboard, etc., or may be hydrolyzed by enzymes into C6 sugars and ferment the sugar into any sugar derivatives, or submitted to acid hydrolysis to form sugar or high value organic chemicals such as Levulinic acid, butyl ester, for example.

Other organic materials that may be produced from the separated organic layer include Furans, Esters, Ethers, and Vanillin, which may be used as a solvent (the lignin dissolving chemical) to continue the fractionation process, or separated and sold as chemicals.

Figure 2:
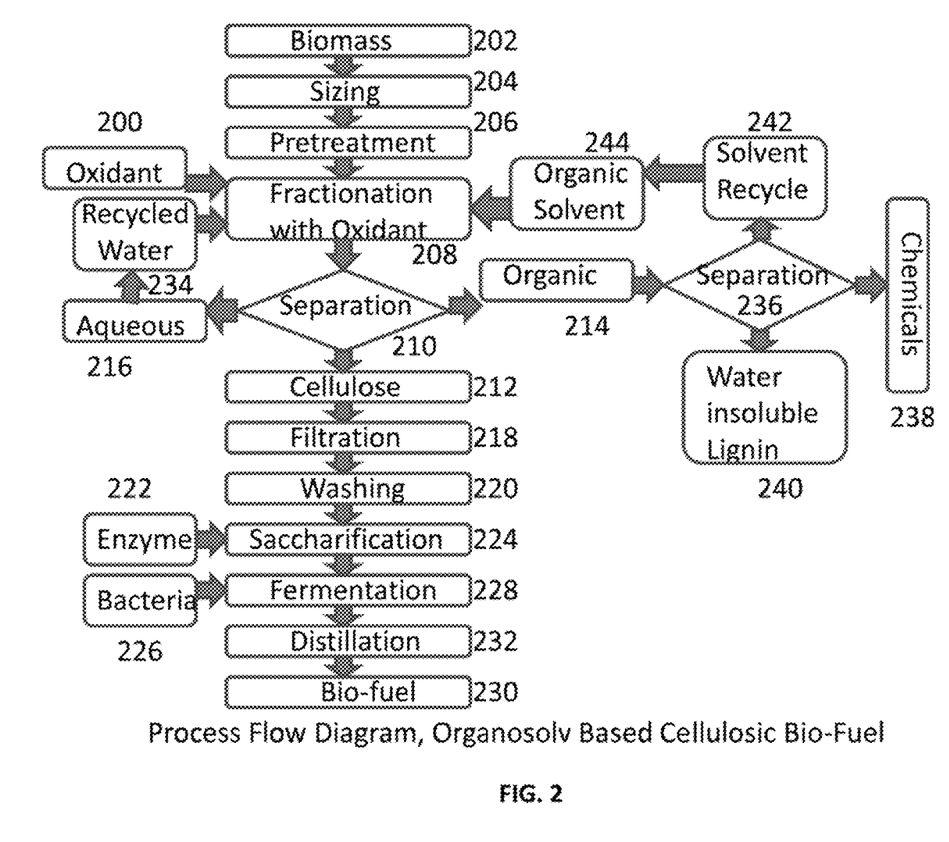
FIG. 2 is a process flow diagram of a typical organosolv-based, biorefinery to convert lignocellulosic biomass intro value added products and biofuel.

Referring to FIG. 2, an oxygen assisted organosolv process includes obtaining the biomass 202, and sizing 204 the biomass by chopping, cutting, milling, and so forth, and using screens or sieves to separate and produce the desire size or until, by one example, biomass pieces of approximately 0.5 inch by 0.25 inch by 1.0 inch are obtained. Other alternatives include about 0.4-0.6 inches by about 0.2-0.3 inches by about 0.9-1.1 inches. Yet another alternatives include all sizes of wood chips and fine particles like saw dust that can be loaded into any typical fractionation reactor by some means. Next, the pieces can be pre-treated 206 by soaking them for some time from a few minutes to several hours or overnight in water, hydrogen peroxide, acid, a mixture of water and hydrogen peroxide, a mixture of water and acid, a mixture of acid and hydrogen peroxide, or a mixture of all to impregnate the biomass, break down some of the cellulose walls and obtain uniform moisture content by one approach. Thereafter, the biomass pieces are placed in the reactor 1.

Figure 3:
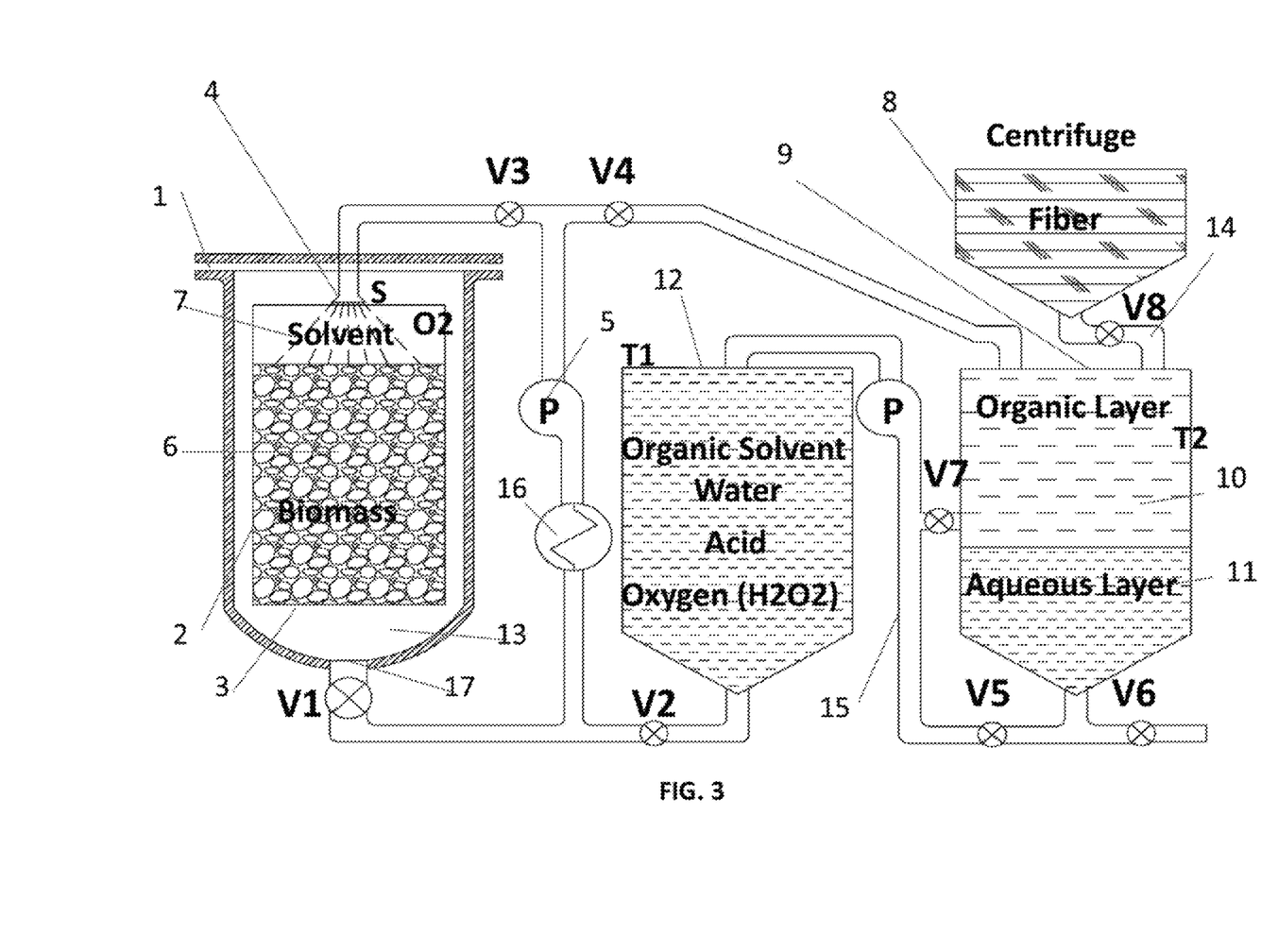
FIG. 3 is a diagram of a bio-refinery fractionation reactor system that can be used to perform the process of FIG. 2.

Referring to FIGS. 2 and 3, the oxygen assisted organosolv processes herein may use continuous or batch processes in an autoclave-type environment. An example of a batch reactor in FIG. 3 is the reactor 1 that is fluidly connected by valves V1 and V4 to a separation or settling tank 9 (T2), and by valves V1 and V2 to an initial solvent tank 12 (T1). Specifically, for the start of each new batch, biomass pieces are placed in the reactor 1. Then, initial lignin solvent is provided from the solvent tank 12 via pump 5, and by opening valves V2 and V3 and closing valves V1 and V4. This delivers the initial solvent to an inlet, or in this case to the top, of the reactor 1. The initial solvent with some hydrogen peroxide or under oxygen atmosphere then is placed in contact with the biomass in the reactor 1 and flows on or over the biomass until it reaches an outlet of the reactor. Valve V1 opens and valve V2 closes to allow circulation of the initial solvent to flow from the outlet or bottom of reactor 1 back to the inlet or the top of reactor 1 as described below. At the end of the process, valve V3 closes and valve V4 opens (and valve V1 is already opened) to transfer the final or resulting liquid that is now the recyclable solvent 13 to the separation tank 9. A valve V5 may be provided as an outlet to collect aqueous layer material from the separation tank 9 which may then be poured back into the initial solvent tank 12 (T1) for reuse in the initial lignin solvent for a new batch of biomass in the reactor 1. A valve V7 may be provided as an outlet to collect organic layer material from the separation tank 9 which may then be poured back into the initial solvent tank 12 (T1) for reuse in the initial lignin solvent for a new batch, of biomass in the reactor 1. Otherwise, the collected material from the separation tank 9 (T2) may be taken away in all or in part by using valve V6 for further processing including separation toward end products. In one form, however, the organic material, or the liquor, may be distilled to remove various organic esters and furans, for example, so that just the lignin dissolving chemicals, or specified amounts of the lignin dissolving chemicals, are reused and placed into the initial solvent tank 12 for use with a subsequent or next new biomass in the reactor 1.

In more detail, the reactor 1 in FIG. 3 includes atmosphere with some oxygen, at least one basket 2 with a solid cylinder and a perforated bottom 3 for holding a biomass 6. A shower head 4 sprays solvent 7 that includes acid, water, and an initial lignin dissolving chemicals with or without hydrogen peroxide, into and inside the basket 2 and onto biomass 6. The solvent 7 flows on, over or through the biomass until it exits through an outlet 17 at the bottom 3 of the reactor as the recyclable solvent 13. In one form, the solvent may not collect within the reactor 1, and may flow continuously through the reactor 1 unless the valve V1 is closed. It will be understood that the reactor may alternatively have other configurations to deliver the solvent to the biomass and through the reactor. Thus, the reactor may also have some type of mixing system such as ultrasound mixer instead or in addition to the shower head so that the solvent is collected in the reactor and then mixed to facilitate chemical reaction between the solvent and biomass.

Figure 4:
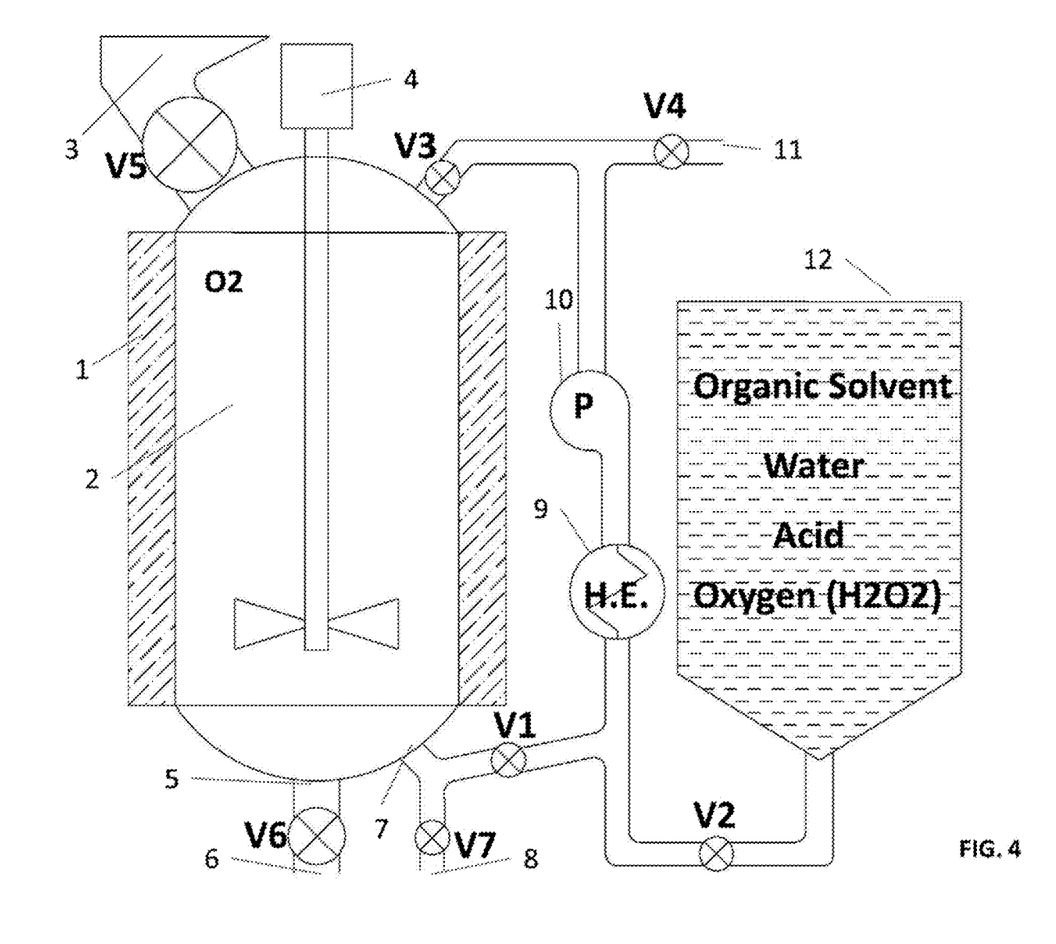
FIG. 4 is another diagram of a fractionation reactor system that can also be used to perform the process of FIG. 2.

Referring to FIG. 4, another example of a reactor for the oxygen assisted Organosolv processes herein that may be used in continuous or batch processes in an autoclave type environment. The reactor 1 in FIG. 4 is connected to hopper 3 by valve V5 that allows lignocellulosic biomass flows into cavity 2. Outlet 5 is a simple pipe and may be equipped with some type of static mixer that connects the cavity 2 to valve 6 and allows the materials inside reactor 1 exit from outlet 6 toward separation 210 of FIG. 2. Tank 12 is used to either premix the organic solvent, water, acid, and hydrogen peroxide, or stage each component of the solvent individually and direct them toward reactor 1 through valve V2. The solvent materials can individually or collectively pass through an optional heat exchanger 9 to increase their temperature to a desire level and pumped through pump 9 and valve V3 into reactor 1. if necessary, the solvent mixture is extracted through screen 7 and valve V1 into heat exchanger 9 and pumped back to reactor 1 via pump 10 and valve V3 to increase or maintain process temperature. Reactor 1 is also can be equipped with some type of external heater such as oil or steam jacket to increase or maintain process temperature inside reactor 1. If desired, part of all of the solvent can be removed through screen 7 via valve V7 through outlet 8 for separation, distillation, filtration etc. and recycles back into reactor 1 via inlet 11, valve V4 and Valve V3. throughout the oxygen assisted Organosoly process, the mixture of biomass and solvent may be agitated by agitator 4, circulating the solvent through valve V1, optional heat exchanger 9, pump 10 and valve V3, or a combination of both or none of them. Also during the oxygen assisted Organosolv process, the atmosphere in reactor 1 may be enriched by oxygen whether an oxidizing agent such as hydrogen peroxide is used with solvent or not.

The initial lignin solvent, by one example, may include about a 50-50 (weight %) of an organic based lignin dissolving chemical and water, plus 0.6 gram industrial hydrogen peroxide per gram of biomass, and 0.05 gram sulfuric acid per gram of biomass. As described herein, the lignin dissolving chemical for the first initial lignin solvent may be any fresh lignin dissolving chemical or chemicals, any recycled lignin dissolving chemical or chemicals, any recyclable solvent, or combination of them plus extra oxidant and acid as required. Alternatively, the initial lignin solvent may be all or in part the recyclable solvent as it is by adding more hydrogen peroxide and acid to it, or after passing in part or all through some type of separation process and adding desired amount of hydrogen peroxide and acid to it. The initial lignin solvent may also have an additional acid including sulfuric acid, acetic acid, formic acid, a combination of them, or all to decrease the pH1 to about 1.0 to 2.0.

The circulation of the recyclable solvent, in one form, occurs without separating any of the material from the recyclable solvent. Thus, the circulation solvent may contain at least organic materials or liquor, lignin, or lignin compounds, water, and sugar, which are all placed back into contact with the biomass at least once, and in one form many times and each time a desire amount of hydrogen peroxide and acid may be added.

Alternatively, a portion of the recyclable solvent may be redirected away from reactor 1 or the circulation loop for more immediate separation and processing while the remainder of the recyclable solvent is being circulated over or through the biomass. In this case, as another option, a fresh initial lignin solvent may be supplied to the reactor to replace the removed recyclable solvent, and during the circulation or cooking period. If fresh lignin solvent and water is added to the recyclable solvent, additional or make up acid and hydrogen peroxide may also be added as well.

After the time period is complete, the initial lignin solvent 7 of FIG. 3 is fully transformed into the recyclable solvent 13 of FIG. 3 which includes liquor enriched with the dissolved lignin and other organic material, lignin, generated chemicals, water, and remaining solvents as mentioned above. This final or resulting recyclable solvent is then extracted into settling or separation tank 9 of FIG. 3 for separation 210 of FIG. 2.

At the end of processing time, the initial biomass 202 converts to pulp 212 that is mostly cellulose with some left over recyclable solvent that is directed to a separation process such as a centrifuge or screw press to extract more solvent form it. The separated liquid from centrifuge 8 of FIG. 3 may be directed to the settling tank 9 through a flow path 14 for one example, or otherwise may be removed from the centrifuge and directed into the staging tank 12. Inside the settling tank 9, the recyclable solvent 13, in one example mainly in a liquid phase, separate into an organic layer 10 (214 of FIG. 2) that floats on top due to its density, and an aqueous layer 11 (216 of FIG. 2) that moves to the bottom of the separation tank 9. The remaining solid 6, (212 of FIG. 2) from the centrifuge 8 is filtered 218 before the cellulose or fiber based pulp is provided for saccharification 224 or acid hydrolysis.

Referring again to FIG. 2, all or part of the aqueous layer 216 is recycled 234 back into the system, in one form, into initial solvent tank 12 of FIG. 3 to be used as part of the initial lignin solvent 7 of FIG. 3 for a next new biomass. In another form, all or part of aqueous layer 216 may go through some type of separation process such as distillation, membrane separation, reverse osmoses, etc. to remove part or all water soluble minerals or valuable chemicals from it before recycling it back to the process. All or part of the organic layer 214 also may be sent to a distillation system to separation 236 to separate desirable chemicals 238 such as furans (including furfural), esters (including formic acid butyl ester, or butyl acetate), ethers, and vanillin, and the lignin 240 from the remaining organic solvent 242 (also referred to as the solvent for recycle or simply solvent recycle).

Figure 9:
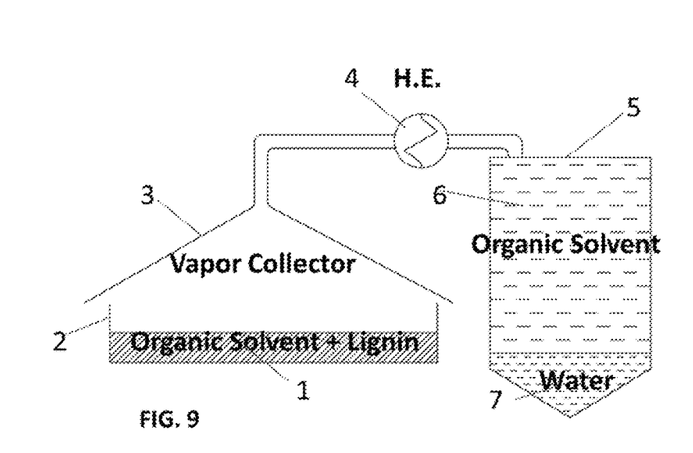
FIG. 9 is a schematic of separation of lignin from lignin dissolving solvent and recovery of the products.

Referring to FIG. 9, the process of separating lignin from lignin dissolving solvent comprises placing the mixture of lignin and the lignin dissolving solvent 1 in an evaporation tray 2, apply heat to evaporate lignin dissolving solvent, use the vapor collector 3, pass the vapor through the heat exchanger 4 to condense the vapor to liquid, and direct the liquid into tank 5 that includes mostly lignin dissolving solvent. However, since water to some extend is also soluble in most of the lignin dissolving solvents, tank 5 also may include, the water 7 that due to its density will stays below the lignin dissolving solvent 6.

Figure 10:
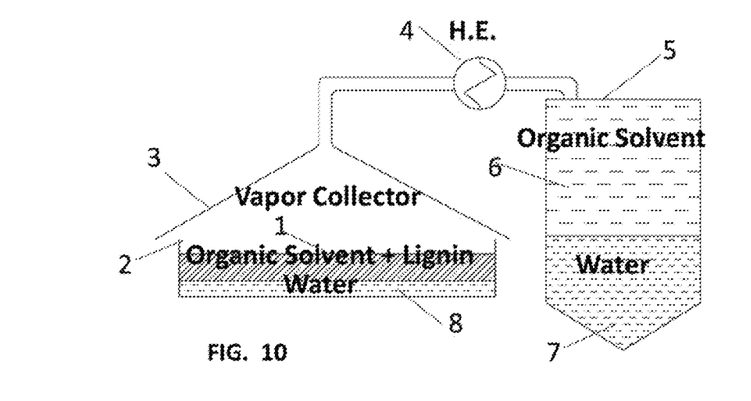
FIG. 10 is a schematic of separation of lignin from lignin dissolving solvent and recovery of the products if additional water is added.

Referring to FIG. 10, the process of separating lignin from lignin dissolving solvent comprises placing the mixture of lignin and the lignin dissolving solvent 1 in an evaporation tray 2, add extra water 8 that usually stays below lignin dissolving solvent, apply heat to evaporate lignin dissolving solvent and water, use the vapor collector 3 to collect vapor and pass the vapor through the heat exchanger 4 to condense it back to liquid form, and direct the liquid into tank 5. And again, since water to some extend is soluble in most of the lignin dissolving solvents, inside tank 5, in addition to the lignin dissolving chemical that stays on top, a water layer 7 exist that stays on the bottom the tank 5. Adding additional water will help most to all lignin dissolving solvent to be evaporated in less time, but also requires more water to be evaporated, condensed, and collected in tank 5.

The separated lignin 240 may be used as described herein, and in one alternative, the lignin may be further mixed with one or more polymers to form a portion of a polymer or plastic object, such as a toy for example, or smaller amount of lignin may be mixed with polymer and used as a colorant in a plastic object. In one form, about 1-50% lignin may be co-injected or co-extruded with other polymers as an additive or as a filler. In another form, about 0.01-5% lignin may be mixed with polymers as a colorant to provide a light tan to a dark brown color for polymers such as poly lactic acid for example. Other polymers are contemplated.

Figure 5:
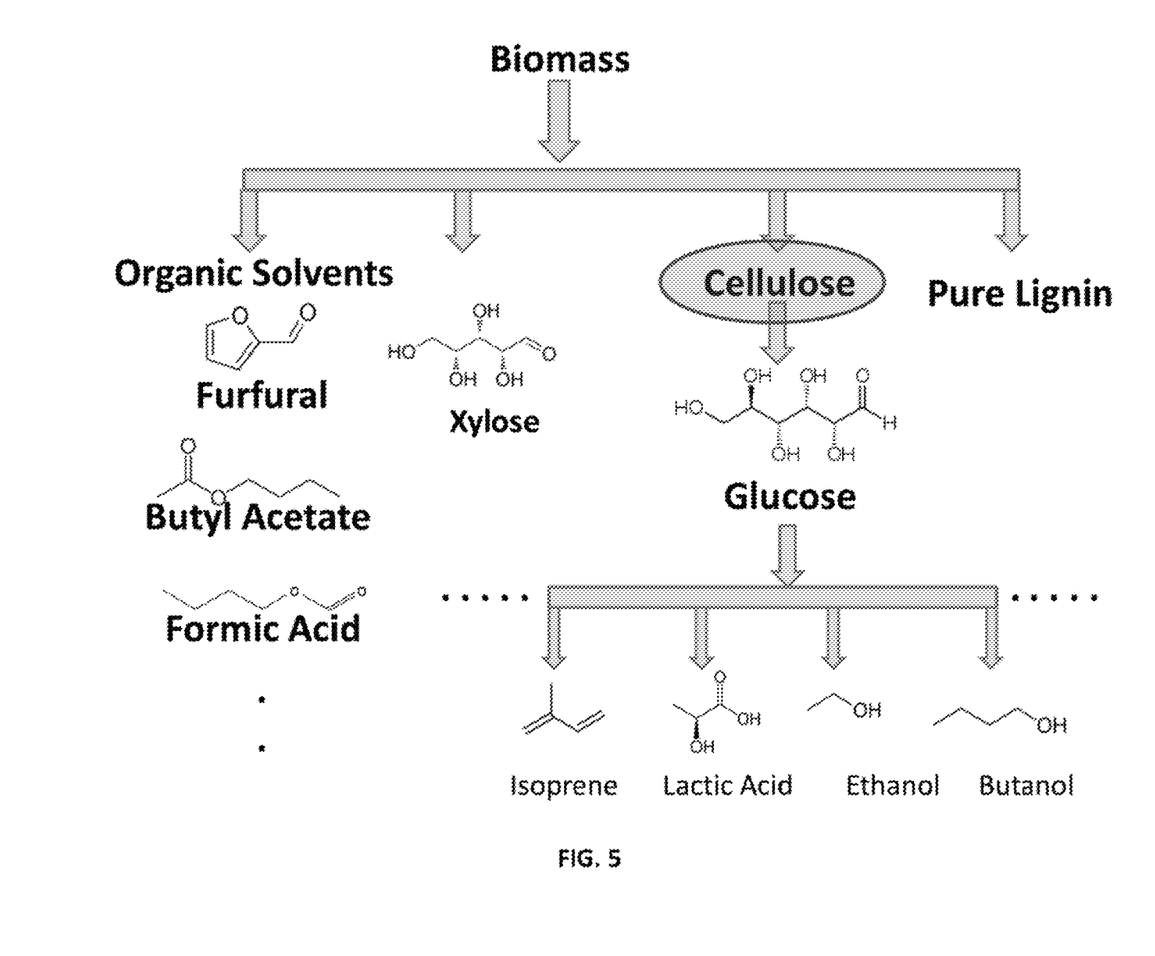
FIG. 5 is a schematic diagram showing some of the core products and chemicals produced from the process described herein.

Referring now to FIG. 5, the following is a more detailed description of a number of products produced by the process described herein. In one example form, the basic four intermediary products produced by the process includes organic solvent, pure lignin, cellulose, and xylose. The organic solvent may include butyl acetate, furfural, formic acid, formic acid butyl ester, etc. Butyl acetate may be processed further to manufacture synthetic fruit flavoring for example, furfural is a chemical intermediate used to produce furfural alcohol for furan resins, formic acid and formic acid butyl ester may be used as preservative and antibacterial agent in livestock feed, and all of them individually, together, or as a mixture with other lignin dissolving solvents, may be used as part of the recyclable solvent for fractionation process. Other details of the major organic materials produced during oxygen assisted organosolv process, if butanol is used as part of the initial lignin solvent, are as follows:

Acetic Acid Butyl Ester:

Other names: Butyl Acetate, Butyl ethanoate, acetic acid, n-butyl ester.

Formula: C6H12O2 Structure:

Furfural:

Other names: furan-2-carbaldehyde, furfural, furan-2-carboxaldehyde, fural, furfuraldehyde, 2-furaldehyde, and pyromucic aldehyde.

Formula: $C_5H_4O_2$ Structure:

Formic Acid Butyl Ester:

Other names: n-Butyl formate; Butyl formate; HCOO(CH2)3CH3; n-Butyl methanoate;

Butyl methanoate; Butylester kyseliny mravenci.

Formula: $C_5H_{10}O_2$ Structure:

Butanic Acid:

Other names: Butyric acid; n-Butanoic acid; n-Butyric acid; Ethylacetic acid; Propylformic acid; 1-Butyric acid;

Formula: $C_4H_8O_2$ Structure:

Butane 1,1-dibutoxy:

Other names: butyraldehyde, dibutyl acetal; lageracetal; 1,1-dibutoxybutane.

Formula: $C_{12}H_{26}O_2$ Structure:

Butannic acid, butyl ester:

Other names: Butyric acid, butyl ester: n-Butyl butanoate; n-Butyl butyrate; n-Butyl n-butyrate

Formula: $C_8H_{16}O_2$ Structure:

Butane 1,1'-[ethylidenebis(oxy)]bis:

Other names: Acetaldehyde dibutyl acetal; 1,1-Dibutoxyethane; Di-n-butyl acetal; Ethane, 1,1-dibutoxy-; 1,1-Di-n-butoxyethane; Dibutyl acetal;

Formula: $C_{10}H_{22}O_2$ Structure:

Propionic Acid, Butyl Ester:

Other names: Propionic acid, butyl ester; n-Butyl propionate; Butyl propionate; n-Butyl propanoate: Butyl propanoate

Formula: $C_2H_{14}O_2$ Structure:

Acetic Acid:

Other names: ethanoic acid

Figure 6:
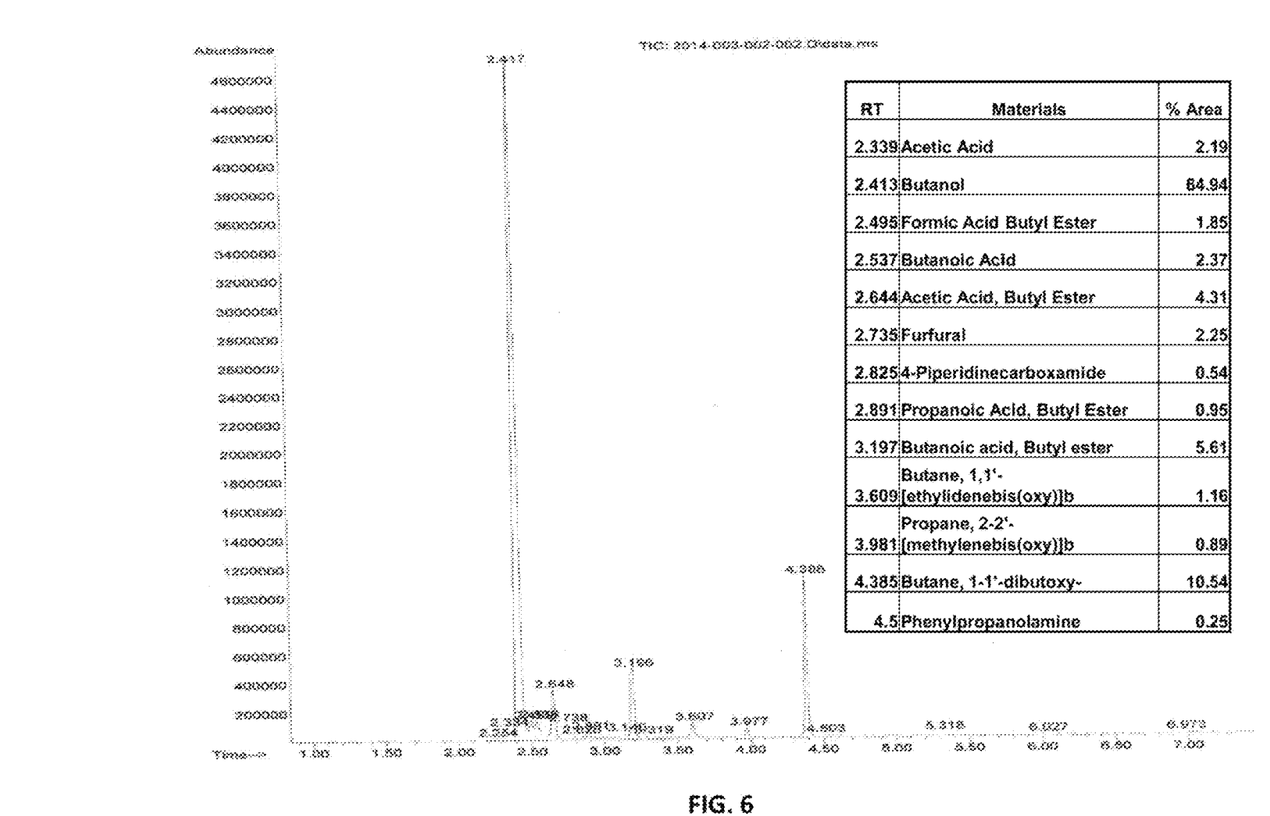
FIG. 6 is a typical gas chromatography-mass spectrometry (GCMS) graph showing organic chemicals produced from a process described herein when butanol was used as the lignin solvent and hydrogen peroxide was used as an oxidant.
Figure 7:
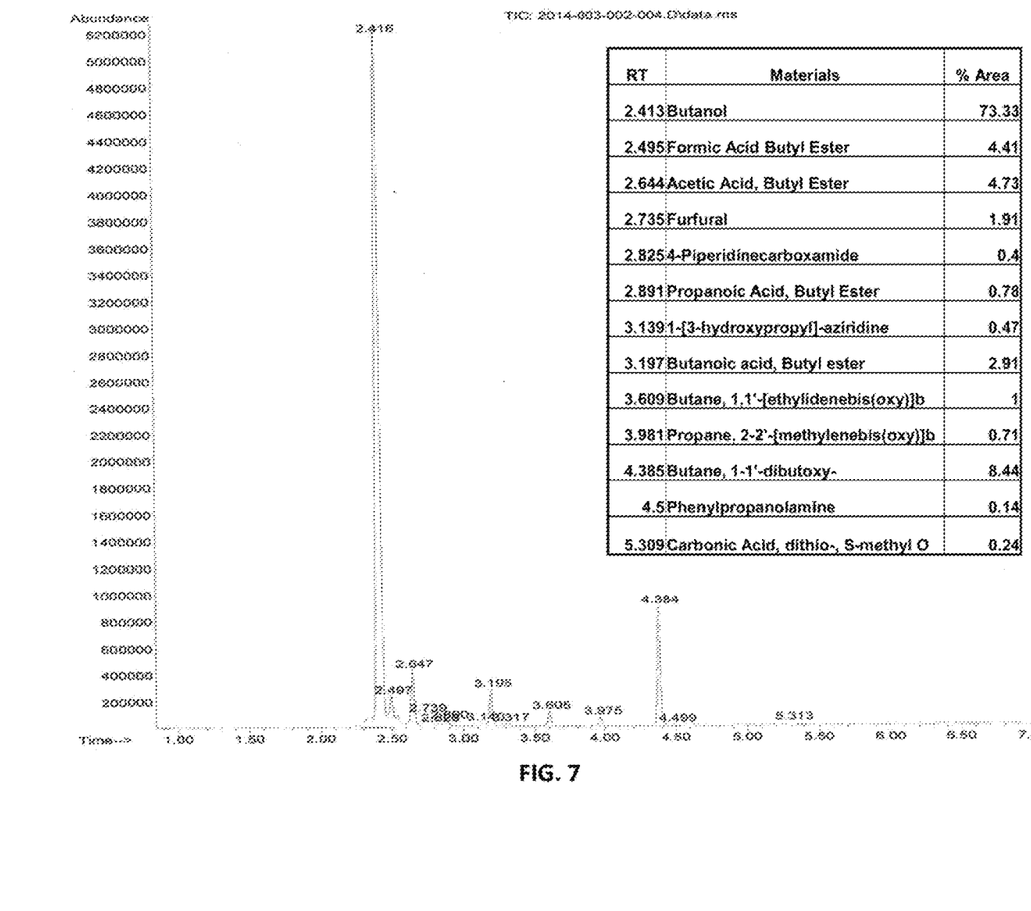
FIG. 7 is another example chart of chemicals reported by GCMS, that can be produced during a fractionation process if butanol is used as the lignin solvent and hydrogen peroxide is used as an oxidant while circulating the recyclable solvent through lignocellulosic biomass.
Figure 8:
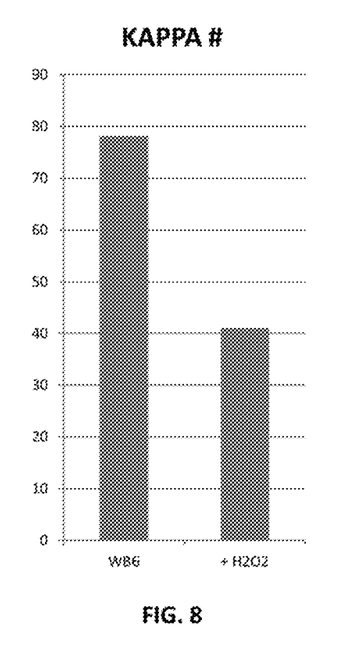
FIG. 8 is a chart showing a typical Kappa Number for organosolv process and oxygen, assisted organosolv process.

Formula: $C_2H_4O_2$ Structure:

Referring to FIGS. 6 and 7, gas chromatography, mass spectrometry (GCMS) graphs of the organic materials produced as a result of oxygen assisted Organosolv based fractionation process using butanol as the lignin dissolving chemical in the initial lignin solvent and industrial grade hydrogen peroxide as oxidant. For these experimentation, 20 kilo grams biomass with 87.64% solid content were place in contact with Organosolv solvent including 61.36 kg butanol, 58.89 kg water, 1.052 kg sulfuric acid, and 10.516 kg hydrogen peroxide as the oxidizing agent inside a fraction reactor as presented on FIG. 3. The process time for both cases were 90 minutes, the graph on FIG. 6 is as a result of one hour and seven minutes ramp up time and the graph on FIG. 7 is as result of one hour and thirty four minutes ramp up time.

following observations are made:
1. Application of an oxidant such as hydrogen peroxide or $O_2$ with an organosolv process allows more aggressive delignification of lignocellulosic biomass and therefore production of pulp with smaller KAPPA number.
2. Application of an oxidant such as hydrogen peroxide with organosolv process allows oxygen condensation reaction of butanol to produce more butane, 1,1-dibutoxy.
3. Presence of an oxidant such as O2 atmosphere increases production of almost all of the produced chemicals such as formic acid, butyl acetate, furfural, etc.
4. The presence of H2O2 and hydrate converts the acetic acid to formic acid, and subsequently the formic acid is converted to formic acid butyl ester. Thus, application of an oxidant such as H2O2 with organosolv process produces more formic acid butyl ester than organosolv process without an oxidant.

While the foregoing written description of the invention enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiments and methods, but by all embodiments and methods within the scope and spirit of the invention as claimed.

What is claimed is:
1. An oxidizing-agent assisted organosolv based fractionation process for delignification of lignocellulosic biomass materials comprising:
  a) reacting organic solvent, oxidant, acid, water, and lignocellulosic biomass with heat to form an insoluble phase and a soluble phase, the insoluble phase comprising delignified biomass and the soluble phase comprising a lignin enriched solution;
  b) separating the soluble phase from the insoluble phase;
  c) separating the soluble phase into an organic phase and an aqueous phase;
  d) recovering a recyclable solvent mixture from the organic phase such that the remaining products comprises lignin; and
  e) reacting the recyclable solvent mixture and additional oxidant, additional acid, additional water, and additional lignocellulosic biomass with heat to form an insoluble phase and soluble phase.

2. The process of claim 1 wherein the organic solvent comprises butanol.
3. The process of claim 1 wherein the oxidant comprises hydrogen peroxide.
4. The process of claim 1 wherein the acid comprises sulfuric acid.
5. The process of claim 1 wherein the ratio of water to organic solvent is about 1:1 by weight.

6. The process of claim 1 wherein recovering the recyclable solvent mixture comprises applying heat to the organic phase to evaporate the recyclable solvent mixture, condensing the evaporated recyclable solvent mixture back into a liquid and collecting the condensed liquid.
7. The process of claim 1 wherein between about 5 grams and about 15 grams of organic solvent is provided per 1 gram of biomass.
8. The process of claim 1 wherein the additional water comprises the aqueous phase.
9. The process of claim 1 wherein up to about 0.6 grams of oxidant is provided per 1 gram of the lignocellulosic biomass.
10. An oxidizing-agent assisted organosolv based fractionation process for delignification of lignocellulosic biomass materials comprising:
  a) reacting organic solvent, gaseous $O_2$, acid, water, and lignocellulosic biomass with heat to form an insoluble phase and a soluble phase, the insoluble phase comprising delignified biomass and the soluble phase comprising a lignin enriched solution;
  b) separating the soluble phase from the insoluble phase;
  c) separating the soluble phase into an organic phase and an aqueous phase;
  d) recovering a recyclable solvent mixture from the organic phase such that the remaining products comprises lignin; and
  e) reacting the recyclable solvent mixture and additional gaseous $O_2$, additional acid, additional water, and additional lignocellulosic biomass with heat to form an insoluble phase and soluble phase.

11. The process of claim 10 wherein the organic solvent comprises butanol.
12. The process of claim 10 wherein the acid comprises sulfuric acid.
13. The process of claim 10 wherein the ratio of water to organic solvent is about 1:1 by weight.
14. The process of claim 10 wherein recovering the recyclable solvent mixture comprises applying heat to the organic phase to evaporate the recyclable solvent mixture, condensing the evaporated recyclable solvent mixture back into a liquid and collecting the condensed liquid.
15. The process of claim 10 wherein between about 5 grams and about 15 grams of organic solvent is provided per 1 gram of biomass.
16. The process of claim 10 wherein the additional water comprises the aqueous phase.
17. The process of claim 10 wherein up to about 0.6 grams of oxidant is provided per 1 gram of the lignocellulosic biomass.
18. An oxidizing-agent assisted organosolv based fractionation process for delignification of lignocellulosic biomass materials comprising:
  a) reacting organic solvent, oxidant, acid, water, and lignocellulosic biomass with heat to form an insoluble phase and a soluble phase, the insoluble phase comprising delignified biomass and the soluble phase comprising a lignin enriched solution;
  b) separating the soluble phase from the insoluble phase;
  c) separating the soluble phase into an organic phase and an aqueous phase; and
  d) reacting the organic phase and additional oxidant, additional acid, additional water, and additional lignocellulosic biomass with heat to form an insoluble phase and soluble phase.

19. The process of claim 18 wherein the oxidant is hydrogen peroxide.

20. The process of claim 18 wherein the organic solvent comprises butanol.

21. The process of claim 18 wherein the acid comprises sulfuric acid.

22. The process of claim 18 wherein the ratio of water to organic solvent is about 1:1 by weight.

23. The process of claim 18 wherein between about 5 grams and about 15 grams of organic solvent is provided per 1 gram of biomass.

24. The process of claim 18 wherein the organic phase comprises between about 5% and about 25% lignin by weight.

25. The process of claim 18 wherein the additional water comprises the aqueous phase.

26. The process of claim 18 wherein up to about 0.6 grams of oxidant is provided per 1 gram of the lignocellulosic biomass.

27. An oxidizing-agent assisted organosolv based fractionation process for delignification of lignocellulosic biomass materials comprising:
   a) reacting organic solvent, gaseous $O_2$, acid, water, and lignocellulosic biomass with heat to form an insoluble phase and a soluble phase, the insoluble phase comprising delignified biomass and the soluble phase comprising a lignin enriched solution;
   b) separating the soluble phase from the insoluble phase;
   c) separating the soluble phase into an organic phase and an aqueous phase; and
   d) reacting the organic phase and additional gaseous $O_2$, additional acid, additional water, and additional lignocellulosic biomass with heat to form an insoluble phase and soluble phase.

28. The process of claim 27 wherein the organic solvent comprises butanol.

29. The process of claim 27 wherein the acid comprises sulfuric acid.

30. The process of claim 27 wherein the ratio of water to organic solvent is about 1:1 by weight.

31. The process of claim 27 wherein between about 5 grams and about 15 grams of organic solvent is provided per 1 gram of biomass.

32. The process of claim 27 wherein the organic phase comprises between about 5% and about 25% lignin by weight.

33. The process of claim 27 wherein the additional water comprises the aqueous phase.

34. The process of claim 27 wherein up to about 0.6 grams of oxidant is provided per 1 gram of the lignocellulosic biomass.

* * * * *